United States Patent [19]

Grage et al.

[11] 4,432,640
[45] Feb. 21, 1984

[54] ADJUSTMENT AND TESTING DEVICE FOR A LASER RANGING SYSTEM

[75] Inventors: Ludger Grage, Eichenau; Werner Ryseck, Oberschleissheim; Franz Michl, Geretsried, all of Fed. Rep. of Germany

[73] Assignee: Siemens Aktiengesellschaft, Berlin & Munich, Fed. Rep. of Germany

[21] Appl. No.: 301,401

[22] Filed: Sep. 11, 1981

[30] Foreign Application Priority Data

Sep. 16, 1980 [DE] Fed. Rep. of Germany ....... 3034922

[51] Int. Cl.³ .......................... G01C 3/08; G01B 11/26
[52] U.S. Cl. ......................................... 356/5; 356/138; 356/150; 356/152
[58] Field of Search .................... 356/5, 152, 138, 150, 356/153

[56] References Cited

U.S. PATENT DOCUMENTS

| | | | |
|---|---|---|---|
| 3,582,215 | 6/1971 | Cornillault | 356/152 |
| 4,068,952 | 1/1978 | Erbert et al. | 356/5 |
| 4,121,890 | 10/1978 | Braun. | |
| 4,139,769 | 2/1979 | McCrum et al. | 250/341 |
| 4,167,328 | 9/1979 | Cross et al. | |
| 4,189,233 | 2/1980 | Hurt et al. | |

FOREIGN PATENT DOCUMENTS

| | | |
|---|---|---|
| 2343596 | 8/1973 | Fed. Rep. of Germany. |
| 2536878 | 8/1975 | Fed. Rep. of Germany. |
| 2536903 | 8/1975 | Fed. Rep. of Germany. |
| 2810673 | 3/1978 | Fed. Rep. of Germany. |
| 1518152 | 5/1975 | United Kingdom. |

OTHER PUBLICATIONS

A. Reichelt et al., "Improved Optical Tapping Elements for Graded-Index Optical Fibers", *Siemens Forsch.-u. Entwickl.-Ber*, vol. 8, No. 3, 1979, pp. 130-135.

G. Knoblauch, "Informationsübertragung über Lichtwellenleiter im Industriellen Bereich", *Siemens Components*, 18, 1980, pp. 144-150 (with Translation).

*Primary Examiner*—S. C. Buczinski
*Attorney, Agent, or Firm*—Hill, Van Santen, Steadman & Simpson

[57] ABSTRACT

An adjustment and test device for a laser ranging system or laser range finder which device is adapted for obtaining the parallel alignment of optical axes of the transmitter and receiver with respect to one another and with respect to the optical reference axis, characterized by a test unit, an optical adapter unit and a mechanical adapter unit. The test unit has a housing, a collimator, which comprises a collimator lens, a beam splitting cube with a reticule, a device for illuminating the reticule and a device for observing the illuminated reticule, and an arrangement for mounting the collimator in said housing for adjustment of the optical axis of the collimator in the housing. The optical adapter unit has an independent housing and has an arrangement for optically coupling the test unit to the laser ranging system which includes at least one movable optical coupling element for interconnecting an optical axis of the laser ranging system to the collimator axis. The mechanical adapter unit has an arrangement for mechanically coupling the test unit onto either the laser ranging system or a support for the laser ranging system so that the adjustments and tests may be carried out.

30 Claims, 12 Drawing Figures

ADJUSTMENT AND TESTING DEVICE FOR A LASER RANGING SYSTEM

BACKGROUND OF THE INVENTION

The present invention is directed to an adjustment and testing device for a laser ranging system which is particularly adapted for parallel aligment of the transmitter and receiver of the system with respect to one another and with respect to an optical reference axis. The device comprises a collimator which consists of a collimator lens, a beam splitting cube with a reticule, a light source for illuminating the reticule and a device or an arrangement for observing the illuminated reticule.

Laser range finders or ranging systems are already employed in a wide scope for various uses. For example, in a military use, they are used for the precise and rapid determination of a range of an object for example a distance between a target object and a weapon. Due to the intense bundling of the laser beam, an exact parallelism of the optical axes of the laser transmitter and the laser receiver as well as an optical reference axis, which may be a sighting line of either a weapon or directional device, is necessary for these range finders. Therefore, for example, after assembly of the overall device, the inspection and precise adjustment of the laser range finder must be undertaken.

SUMMARY OF THE INVENTION

The present invention is directed to providing an adjustment and test device for a laser ranging system or range finder which device, after all, renders possible the exact measurement and adjustment of the relative optical axis. For example, a device enables a precise alignment of the parallelism of the optical axes of the laser transmitter and receiver with respect to one another and with respect to an optical reference axis, which may either be a built-in axis or a reference axis of an external device. The adjustment and test device enables making the adjustments and alignments without a free-spaced measurement with a security risk and measuring uncertainities which are connected therewith.

To accomplish these goals, the adjustment and test device of the present invention comprises a test unit having an independent housing, a collimator, and means for mounting the collimator in the housing of the unit with an adjustment of an optical axis of the collimator in said housing, said collimator comprising a collimator lens, a beam splitting cube with a reticule, beams for illuminating the reticule, and means for observing the illuminated reticule; an optical adapter unit having an independent housing and having means for optically coupling the test unit to the laser ranging system, said means for coupling including at least one movable optical coupling element for interconnecting speed optical axes of the laser ranging system to the collimator; and a mechanical adapter unit having means for mechanically fastening the test unit and the optical adapter unit on the laser ranging system so that test and adjustments can be carried out thereon.

Thus, the adjustment and test device of the present invention consists of three units namely a test unit with a focal collimator as well as an optical coupling unit and a mechanical coupling unit. The focal collimator with the assistance of the means for adjusting its optical axis can be aligned without difficulties to a reference axis which under certain conditions can also coincide with the laser receiver axis of the system. After the adjustment of the collimator axis relative to the reference axis by utilizing the optical coupler unit, the transmitter and receiver axes of the laser ranging system can be aligned parallel to one another and parallel to the reference axis. Thus, on the basis of its favorable structure with three compact homogeneous units, the device of the invention makes it possible to execte the test and adjustment operations both on built-in as well as external devices without requiring a free-spaced measurement. As a consequence of its advantageous structure, the inventive device can be designed in such a manner that no release of harmful laser radiation can occur during the alignment and testing operation. The testing adjustment of the laser ranging system can therefore occur within an enclosed space without requiring the use of protective glasses for protection from the laser radiation.

Laser range finders usually have two optical axes, namely the receiver axis and the transmitter axis. As already described, these axes must be aligned precisely parallel with respect to one another and with respect to a reference axis. Since the axial spacing of the various laser types are of different sizes, the beam path of the axes of the laser ranging system to be respectively measured are caused to coincide in an advantageous manner with the beam path of the collimator of the present testing device by use of movable optical coupling elements which for example are in the form of "Z" arrangement of reflection mirrors which are arranged parallel to each other at a given distance. In comparison to a large aperture collimator with which all optical axes to be measured can be simultaneously covered, the unit of the present invention has significant advantages. One of these advantages is that the focal collimator can be kept small in terms of its dimensions. Because only radiation which is close to its axis is measured (small aperture ratio), the measuring precision is very high. Because the measurement is carried out with an axial-symmetrical beams, additional advantage occurs because the influence of the temperature response of the focal collimator on the measuring precision is practically eliminated.

The number of optical coupling elements bridging the optical axes of the device of the present invention depends on the structure of the laser ranging system. In a system in which the receiver axis and the reference axis coincide, at least one optical coupling element is required which bridges the spacing of the transmitter axis and the collimator axis. For a case in which the reference axis is different from the receiver axis, at least two optical coupling elements are employed with one for bridging the space between the transmitter axis and the collimator axis and another for bridging the space between the collimator axis and the reference axis. Finally, an additional coupling element may be necessary when the collimator axis deviates from the receiver axis. This additional or further coupling element then bridges the space between the collimator axis and the receiver axis.

In the device of the present invention, the collimator is advantageously designed as an infrared collimator and has an infrared light source, a filter which is disposed in the beam path of the infrared light source, an infrared image transducer and an observation means which is an ocular for observing an image of the infrared image transducer which image was reflected by a mirror. In this manner, it is possible to work in the visible spectral range with a single device providing visual observations whereas the actively measuring collimator lies in a nonvisual range and works with an operating wavelengths of the laser range finder. For example, in a wavelength $\lambda = 1.084$ $\mu$m which would be provided by a YAG-Nd laser.

However it is also possible with a collimator designed with an infrared collimator to employ a television camera with a separate monitor for the observation of the infrared illuminated reticule instead of the infrared image transducer with an ocular. Thus, the means for observing the infrared illuminated reticule can either be the infrared image transducer with an ocular or the television camera arrangement.

In the inventive device, attenuation filters are expediently provided in the beam path between the laser transmitter and the collimator. In addition to the measurements of parallelism of the optical axis of the laser transmitter and receiver with respect to one another and with respect to the optical reference axis, inspection of the remote field and of the divergence of the laser beam can be simultaneously executed with the device of the present invention. In addition, a measurement of the receivers field of view can also be obtained without any additional equipment being necessary.

In the case of a laser range finder, however, it may be necessary to check further important system characteristics from time to time and/or given specific uses. It would therefore be advantageous to have an adjustment and test device available which in addition to the measurement of the optical axis also makes possible a check of a more important system characteristics. It is therefore an object of the various further embodiments of the invention to create such an adjustment in the test device. In an embodiment of the present invention, a scattering unit with a dispersion disk which diffusely scatters the laser light of the transmission beam is provided in its own closed space in the test unit. A photo element is connected to a power measurement unit and is disposed in the scatter range of the dispersion disk. A power measurement component is created by this scattering unit and a check of the output power of the laser transmitter can be executed by this scattering unit.

A particularly advantageous embodiment of the inventive test device is that one end of at least one light waveguide line of a specific length is coupled into the scatter range of the dispersion disk and the other end of the light waveguide is coupled into the collimator. Thus, the transit time from the laser range finder, which time depends on the length of the light waveguide which functions as an optical delay line, can be evaluated as a telemetric value. Given such a device, a check of the telemetry precision can be simultaneously carried out.

In a further advantageous embodiment of the inventive device with two light waveguide lines, the additional light waveguide lines exhibits such a length that a differential length corresponding to a specific measuring path will occur due to the additional light waveguide line. By means of redirecting a light component of the transmission beam via the additional optical delay line forming a bypass path, a function test of the double echo evaluation or respectively a check of the depth resolution can be carried out.

A measurement of the system sensitivity by way of determining the extinction value is also simultaneously possible with the assistance of the scattering unit provided in the test unit in conjunction with the provision of the attenuation filtes. In order to be able to undertake these individual measurements with the existing optical coupling elements, it is expedient for the optical coupling element of the optical adapter which bridges the spacing between the collimator axis and the transmitter axis to also bridge the spacing between the scattering unit and the transmitter axis. Thus when the collimator output axis and the scattering unit axis are disposed to lie on a circular arc, the element can be pivoted on the transmitter axis to bridge the space between either the collimator axis and the transmitter axis or between the axis of the scattering unit and the transmitter axis.

Another advantageous embodiment of the adjustment and testing device is the particular simple manipulation of the setting of the collimator axis to the reference axis due to the means for mounting the collimator in the housing of the test unit. The means for mounting the collimator enables movement of the collimator in both the x and y direction of a coordinate system.

When given a simple, compact execution of the mechanical adapter unit, which can be employed for the adjustment and test device, it is advantageous to provide the mechanical adapter unit of at least two support plates. One of the support plates serves as a base for receiving screw-type fasteners of the test unit and the other support plates of the unit are disposed at right angles with respect to the one support plate and have the means for fastening the mechanical adapter unit to the laser ranging system or its support structure.

It is also advantageous in view of the operational reliability of the adjustment and test device to design a test unit to include a safety device such as a safety circuit so that the test procedures can be carried out with the safety circuit of the safety device being closed. By so doing, an intended emergence of a laser radiation which may endanger the operating personnel is prevented.

Finally, it is desirable for both the structural as well as the operational view when all of the operating and display elements of the test unit of the adjustment and test device are combined on an operating and display console or unit which is removable secured to the test unit and is an independent unit. Thus, the test unit can also be operated from a set off operating and display field.

DESCRIPTION OF THE PREFERRED EMBODIMENTS

Figure 1:
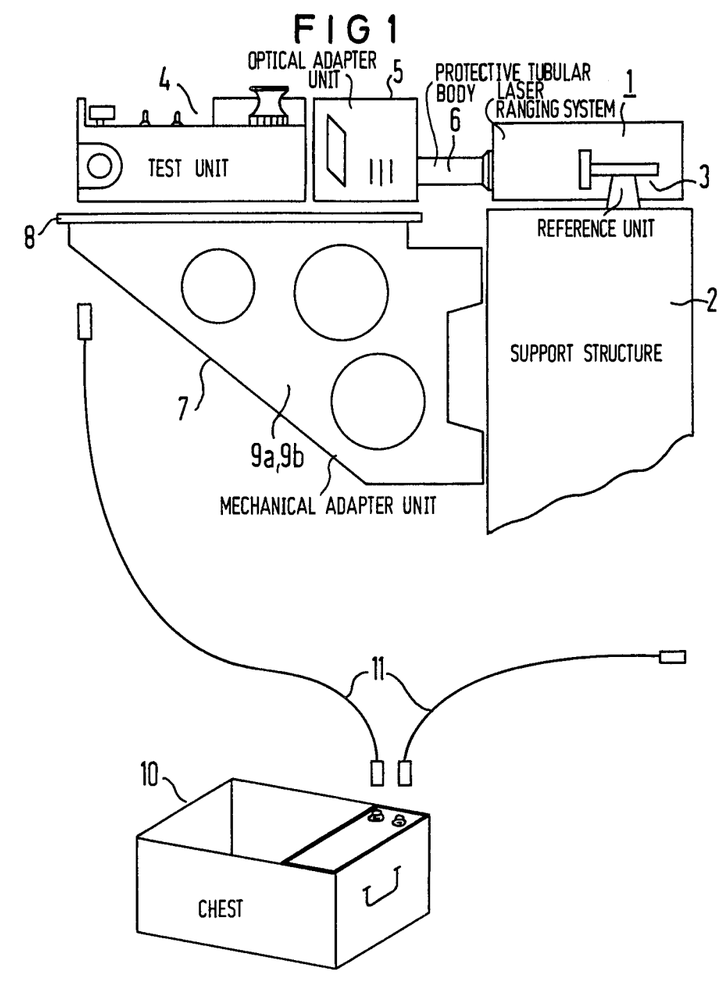
FIG. 1 is a side view of the adjustment and test device of the present invention positioned on a laser ranging system.

The principles of the present invention are particularly useful when incorporated in a adjustment and test device generally indicated at 100 in FIG. 1. The test device 100 is mechanically and optically coupled to a laser ranging system 1 or laser range finder. The laser ranging system is secured to a support structure 2 which also supports a reference unit 3 belonging to the system. The optical axis of the reference 3 is offset from the optical axis for the laser transmitter and for the laser receiver in the illustrated system.

The device 100 is composed of three independent units which are a test unit 4, an optical coupling or adapter unit 5, and a mechanical adapter or coupling unit 7 which forms means for mechanically coupling the test unit 4 and the optical adapter unit 5 to the laser ranging system 1 or to the support structure 2 of the laser ranging system. As illustrated, the optical adapter unit is mechanically coupled to the test unit and has a housing with a protective tube or body 6 extending therefrom for surrounding the light beam from the transmitter of the ranging system 1.

The mechanical adapter unit 7, as illustrated, is formed by three support plates 8, 9a and 9b. The plates 9a and 9b extend perpendicular from the plate 8, which supports the units 4 and 5 that are held by conventional means such as by screw type fasteners on the plate 8.

A power supply for the test unit 4 is illustrated as being housed in a chest 10, which simultaneously serves for a transporting chest or case for the test unit and for the connections and terminal cables 11 and for tools. The chest 10 can be covered in a waterproof manner with a cover not illustrated. The optical and mechanical adapter units can also be housed in an additional transporting chests or cases which are not illustrated which among other things can contain additional tools for further connection and additional terminal cables.

Figure 2:
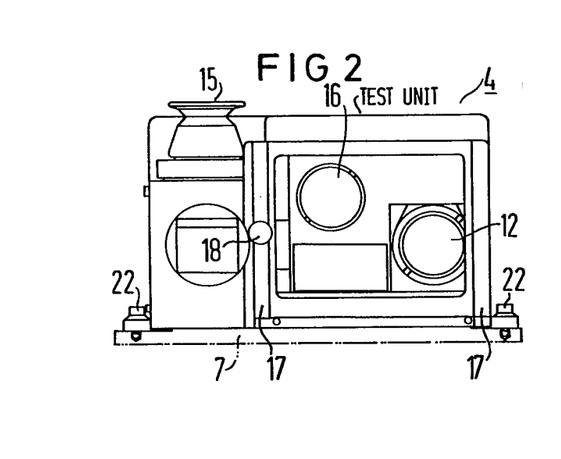
FIG. 2 is an end view of a test unit which forms a part of the adjustment and test device of the present invention.
Figure 3:
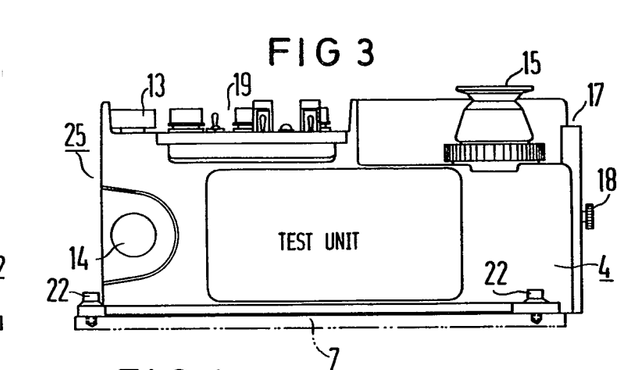
FIG. 3 is a side view of the test unit of FIG. 2.
Figure 4:
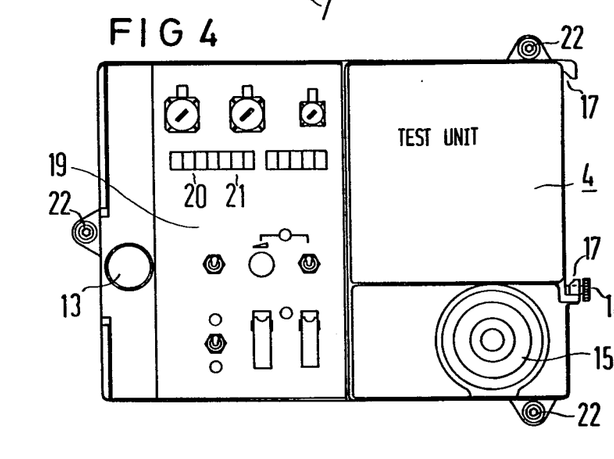
FIG. 4 is a plan view of the test unit of FIGS. 2 and 3.

As best illustrated in FIGS. 2, 3 and 4, the test unit 4 is an independently designed unit with its own housing and exhibits a focal collimator which is an essential component of the device. The collimator has a collimator lens 12 which is illustrated in FIG. 2. In order to set the collimator axis to the optical axis of the reference unit 3, adjustable device or means 25 is provided in the test unit 4. This adjustment device 25 essentially consists of a setting gear which can be actuated from the outside by means for two control knobs 13 and 14 and thus enables adjustment in two directions. For purposes of adjustment, the collimator is expediently disposed on a support device which can be moved in the x and y direction of the coordinate system by the adjustment device 25. By so doing, the collimator is internally tilted in two axes in such a manner that the collimator axis lies precisely parallel to the reference axis. Given too great a deviation of the collimator axis, a preadjustment by means of a mechanical or optical alignment can be made possible if necessary.

The test unit also is equipped with an ocular 15 which acts as means for observing the reticule which will be discussed hereinbelow. In addition, the unit has a scattering means or unit 16. As particularly illustrated in FIGS. 3 and 4, the test unit is designed with a pair of dovetail guide rails and one rail 17 has a screw tightener or clip 18. These are placed on a front surface and enable mechanical coupling of the adapter unit 5 to the test unit 4. To complete the coupling, the housing of the optical adapter unit 5 also has dovetail guidance surfaces which will be received by the dovetail guide rails 17.

Finally an operating and display field 19 is secured to the test unit 4 and provides operating and display elements for the execution of the measurements, the checks and circuits being combined on said unit 19. The operating display field unit 19 is designed as an independent unit and is removably secured to the test unit 4 so that the test unit can also be operated from a remote position. The operating display field unit 19, for example, is provided with two telemetry value displays 20 and 21, with a transmit mode connection as well as with digital numerical displays for various test operations. Finally the test unit 4 is also designed with an automatic self test device with signalization of the operational readiness of the device and monitoring of the electrical functions of the test unit. The unit 4 also includes a safety device so that the test operations can only be carried out when a closed safety circuit of the safety device has been provided.

As can be further seen from FIGS. 2, 3 and 4, the test unit 4 is secured to the mechanical adapter unit 7 by means of three screws 22. The mechanical adapter makes possible the mensurationally fault-free attachment of the test unit 4 and the optical adapter unit 5 to the laser ranging system to be checked. The test unit 4 and the laser ranging system are coupled in such a manner that the collimator output with the collimator lens 12 is precisely opposite the laser receiver so that the collimator axis and the receiver axis are aligned.

A detailed structure of the inventive device will be discussed utilizing FIG. 5 in which the device 100 and the laser ranging system 1 as well as the couplings are schematically illustrated. The test unit 4, as already mentioned, contains an adjustment device 25 with two control knobs 13 and 14, a scattering unit or means 16 and the collimator 26 with an axis 34. The collimator 26 is designed here as an infrared collimator which is corrected to the wavelength of for example 1064 nm and 633 nm. The infrared collimator 26 in this instance consists of a collimator lens 12, a beam splitter cube 27 with a reticule 28 provided on one surface of the cube, and an infrared light source 29 for illuminating the reticule 28. The illuminating source 29 has a filter or filter element 30 placed in its path for a narrow band filtration. In addition, the collimator 26 includes an infrared image transducer 31 which converts the infrared image of the reticule 28 into an observable image. The ocular 15 is equipped with a protective filter and allows observing an image created by the image transducer 31 of the illuminated reticule 28 of the beam splitter cube 27 which image is reflected by a mirror 99 into the ocular 15. Moreover, additional lens systems can also be inserted into the collimator beam path. The beam paths of the infrared light source 29 and of the infrared image transducer 31 proceed parallel to one another and are perpendicular to the beam path 90 of the collimator. The beam path of the infrared light source is reflected into the beam path 90 of the collimator by means of the divider or partial reflective mirrors 32 and the beam path that is received by the infrared image transducer is reflected from the beam path 90 of the collimator by means of the mirror 33. The collimator or lens 12 and the beam splitter cube 27 lie on the collimator axis 34.

Figures 5, 6:
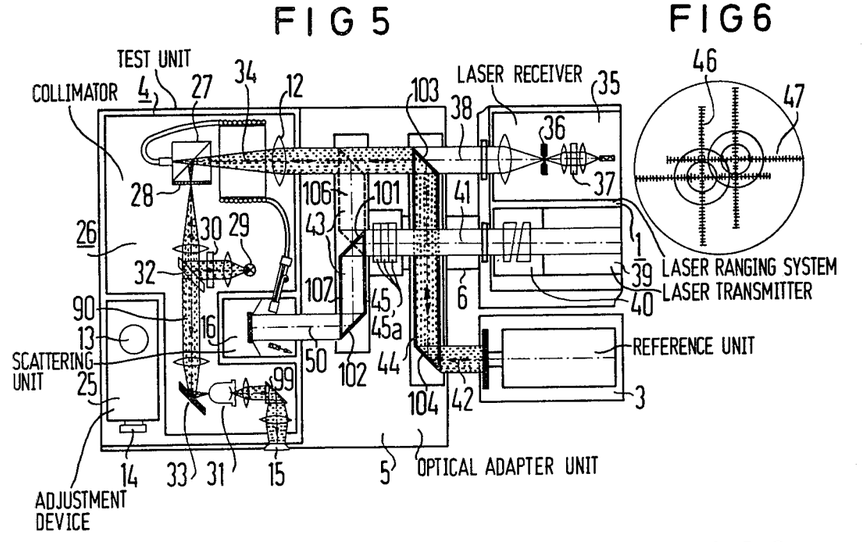
FIG. 5 is a plan view with portions removed for purposes of illustration of the test unit being optically connected to the laser ranging device by the optical coupling unit with the particular light pattern occurring for alignment of the collimator axis to the reference axis being stippled.
FIG. 6 is a view at the means for observing of the collimator reticule and the reticule of the reference unit during alignment of the collimator axis to the reference axis.

The laser ranging system or laser range finder cosists of a laser receiver 36 which is illustrated in FIG. 5 as positioned opposite the collimator 26 and has a field of vision diaphragm 36, a filter arrangement 37 and a corresponding receiver optics with a receiver axis 38. In addition to the receiver 35, the system 1 has a laser transmitter 39 with a deflection unit 40 formed by two wedge shaped disks and has a corresponding transmission optics with a transmitter axis 41. In addition, the reference unit 3 with a reference axis 42 is also illustrated in FIG. 5 and is positioned offset from the receiver axis 38 and provides a reference axis 42 of a sighting device.

The optical adapter unit 5, which also is designed as an independent unit which has its own housing, is provided for the optical coupling between the test unit 4 and the laser ranging system 1 which has the laser receiver 35, the laser transmitter 39 and the reference unit 3. It is essential that the optical adapter unit 5 exhibits two movable optical coupling elements 43 and 44 respectively which have different lengths. Each of these coupling elements has at least two reflector or deflection mirrors which are disposed parallel to one another and are designed here for example a "Z" deflection mirrors on the ends of transparent elements having the form of a parallelepiped. For example, the coupling element 43 has parallel mirrors 101 and 102 and the element 44 has parallel mirrors 103 and 104. Each of the coupling elements 43 and 44 are advantageously insensitive to adjustments within certain limits. The shorter coupling element 43 bridges the space or offset between the transmission axis 41 of the laser transmitter 39 and the collimator axis 34 of the collimator 26 while in one direction indicated 106. The element 43 is pivoted from the position 106 in FIG. 5 to a position 107 so that the transmitter axis 41 is connected to the scattering unit 16. It should be noted that the collimator axis 34 and a center axis 50 of the scattering unit 16 are each at an equal distance from the axis 41 of the transmitter and thus lie on a circular arc utilizing the transmitter axis 41 as the center. The longer coupling element 44 bridges the space of offset between the collimator axis 34 and the reference axis 42 and can have its entry ports rotated around a point adjacent the transmitter axis 41 so that it can be moved from the position illustrated in FIG. 5 with the mirror 103 on the axis 34 and the mirror 104 on the axis 42 to a position where the mirrors are out of the two axes. In addition, the optical adapter unit 5 has a plurality of interchangeable attenuation filters 45, which are provided in the beam path from the laser transmitter 39 before it reaches collimator 26 and as ilustrated are disposed preferably between the coupling elements 43 and 44. The attenuation filters 45 serve for measurement of the extinction value to be described further hereinbelow and expedient consist of calibrated glass filters. For the purpose of lessening the laser beam, at least one additional attenuation filter 45a may be provided which can be pivoted into and out of the beam path between the transmitter 39 and the collimator 36. Finally on the housing of the units which faces the laser transmitter 39, the optical adapter unit 5 has a closed protective tubular body 6 which bridges the space between the optical adapter unit and the transmission optics of the transmitter 39 to prevent any leakage of the laser radiation which might be harmful to the operating personnel.

The measuring operation of the device 100 begins with the basic adjustment of the device, i.e. the parallelism must be produced between the collimator axis 34 and the reference axis 42 of the reference unit 3. As illustrated in FIG. 5, the receiving axis 38 and the reference axis 42 do not coincide with each other and the beam path of the infrared collimator 26 as indicated by the stippled path in FIG. 5 are deflected or reflected to the reference axis 42 by means of the mirrors 103 and 104 of the longer coupling element 44 of the optical adapter 5. The optical axis 34 of the collimator is then precisely aligned to the reference axis 42 with the assistance of the adjustment means 25 so that the cross line 46 (FIG. 6) of the collimator reticule 28 is brought to coincide with a cross line 47 of a reticule of the reference unit 3 by means of observations in the ocular 15. As illustrated in FIG. 6, the cross lines 46 and the cross lines 47 are offset from one another. After these cross hairs are brought into coincidence, the axis 34 will be parallel to the axis 42.

Figures 7, 8:
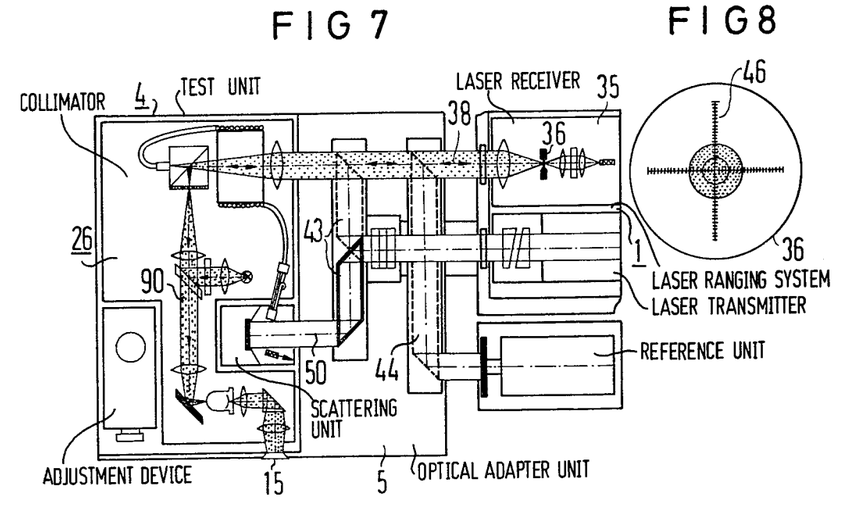
FIG. 7 is a plan view with portions removed similar to FIG. 5 with the light paths during the step of checking the optical axis of the receiver being stippled.
FIG. 8 is a view at the means for observing showing the alignment of the reticule of the collimator with the field of vision diaphragm of the laser receiver.

In order to check and adjust the optical axes of the laser range finder, the test unit 4 is mounted to the range findings system in such a manner that the collimator 26 is precisely opposite the receiver 35. In order to check the alignment of the optical axis 38 of the receiver to the axis 34, the coupling element 44 is pivoted away so that the mirrors such as 103 is out of the beam path of the collimator 26. Collimator 26 is now directly in front of the receiver 35 as illustrated in FIG. 7. The field of vision diaphragm 36 of the receiver 35 and thus the position of the receiver axis 38 is sharply imaged via the collimator as illustrated in FIG. 8. The diameter of the diaphragm 36 is a measure of the receivers field of vision. By observing the image of the receiver's field of vision diaphragm 36 in the ocular 15, the receiver's field of vision can be measured in this manner and the adjustment of the receiver axis 38 can be monitored and corrected.

It should be noted that both during the step of adjusting the parallelism of the axis 34 of the collimator 26 to the reference axis 42 and also the adjusting the axis 38 of the receiver as illustrated in FIG. 7, the shorter coupling element 43 is in the position 107 so that its mirrors such as 102 is out of the path of the light being projected by the collimator.

Figures 9, 10:
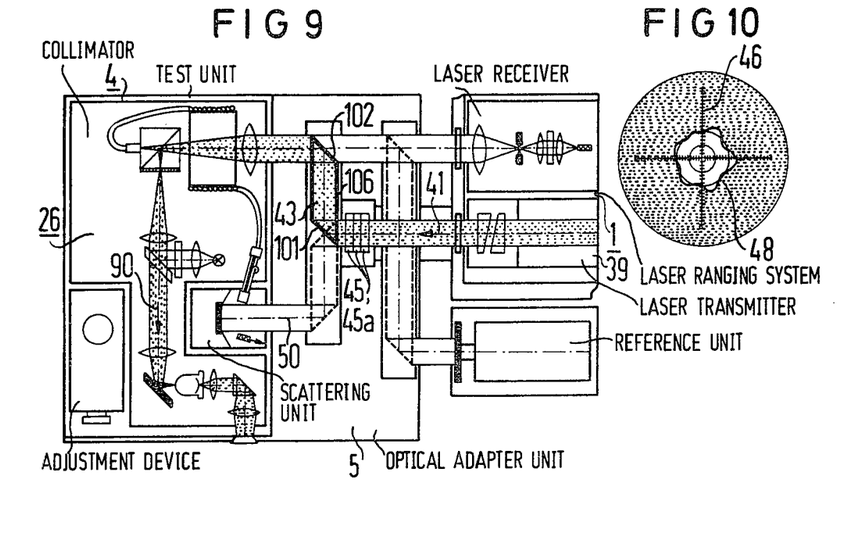
FIG. 9 is a plan view with portions removed similar to FIG. 7 with the light paths, during the alignment of the optical axis of the laser transmitter being stippled.
FIG. 10 is a view at the means for observing of the collimator reticule and the laser beam image during the checking of the alignment of the laser transmitter axis.

The adjustment of the transmitter axis 41, the transmission beam divergence and the remote transmission field can be checked in a corresponding manner. In order to check the optical axis 41 of the transmitter 39, the short coupling element 43 is pivoted to the position 106 so that its mirror 101 and 102 reflect the emission of the transmitter 39 after they have passed through the filters 45 into the collimator 26. The remote field of the laser beam is imaged as a spot 48 as illustrated in FIG. 10 and renders possible the measurement of the optical axis of the transmitter. The diameter of the laser beam, i.e. the luminescent spot 48 is a measure of its divergence.

Figure 11:
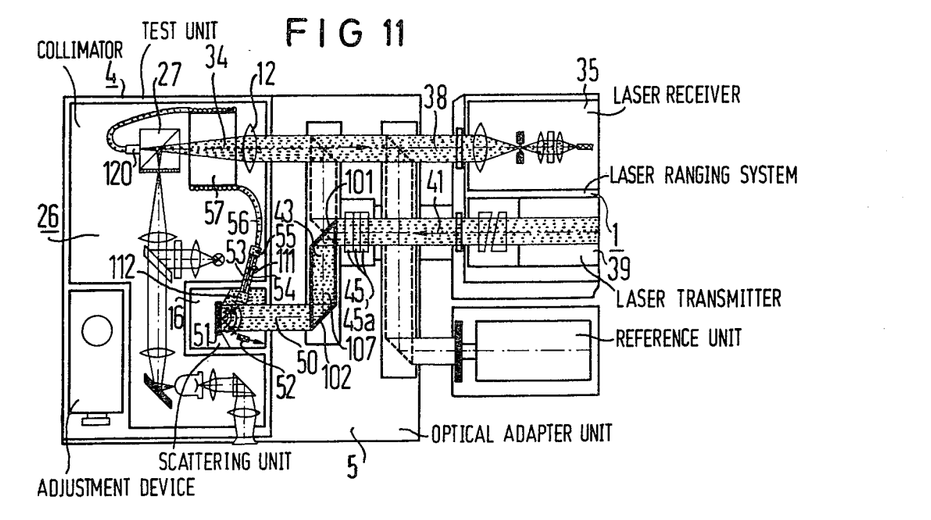
FIG. 11 is a plan view with portions removed of the device of the present invention with the path of the light while checking the output power of the laser transmitter, checking the telemetric precision, and measuring system sensitivity being stippled.
Figure 12:
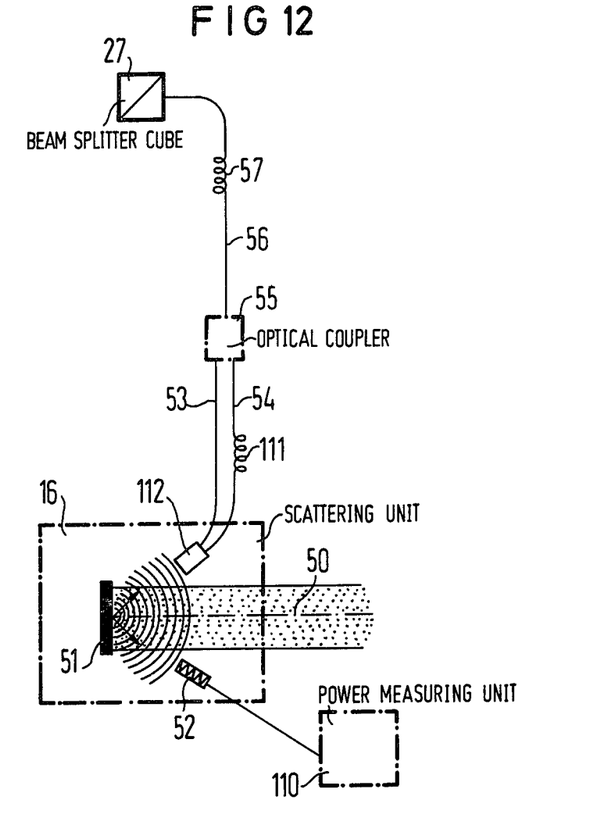
FIG. 12 is an enlarged portion of FIG. 11 illustrating the measuring unit and the relationship of the two waveguides to the reflecting dispersion disk.

The next testing operation such as monitoring the output power of the laser transmitter 39, the checking of the telemetry precision and the measuring of the system's sensitivity can be undertaken by means of a scattering unit 16 which is best illustrated in FIG. 11. As illustrated, the scattering unit 16 is provided in its own closed space in the test unit 4. To this end, the scattering unit 16 consists of a reflective dispersion disk 51 disposed on the center axis 50 of the scattering unit which diffusely scatters the laser light of the transmission beam. The scattering unit also consists of a photo element 52 for example a photo detector which is provided in the scattering range of the dispersion disk 51 and the element 52 is connected to a power measurement unit 110 (FIG. 12). Moreover, one end 112 of each of two light waveguide lines or fibers 53 and 54 are coupled to the scattering range of the dispersion disk 51 and are combined or coupled into a common light waveguide line or fiber 56 via an optical coupler 55. The other end of the common light waveguide line 56 is coupled into the collimator 26 by being arranged on the beam splitting cube 27 with the light being discharged by the waveguide 56 being on the axis 34 of the collimator. The light waveguide line 56 is wound into a coil 57 which is provided in the housing of the test unit 4 and is illustrated as being concentrically disposed with respect to the collimator axis 34 between the beam splitter tube 27 and the collimator lens 12. The coil 57 however can also be housed in a scattering unit 16. The one light waveguide line formed by the two light waveguides 53 and 56 has a specific length in the range of for example 300 to 900 m and represents an optical delay line. The other light waveguide line formed by the two light waveguides 54 and 56 has a length which is different from that of the first light waveguide line because the light waveguide line 54 is longer than the light waveguide line 53 and forms an additional optical delay line as a bypassed path which has a specific length such as produced by a coil 111, best illustrated in FIG. 12. The difference in length in the two groups of fibers, i.e. the fiber group 54, 56 and the fiber group 53, 56 is such that the differential length corresponds to a specific test path due to the addition of this bypass path which enables checking the resolution of the depth of the laser ranging system 1.

The optical coupler 55 can be a conventional optical coupler. Examples of the optical coupler are described by G. Knoblauch, "Informationsübertragung über Liehtwellenleiter Im Industriellen Bereich", *Siemens Components* Vol. 18, No. 3, 1980, pp. 144–150 and by A. Reichelt et al, "Improved Optical Tapping Elements for Graded-Index Optical Fibers", *Siemens Forsch.-u.- Entwickl.-Ber.*, Vol. 8, No. 3, 1979, pages 130–135. The optical coupler can be used for combining the plurality of light waveguides lines 53 and 54 to the common light waveguide line 56.

For the purpose of monitoring the power of the beam from the transmitter 39, the beam of the laser transmitter 39 is now deflected or reflected into the scattering unit by the short coupling element 43 which is in the position 107 with the mirror 102 being on an axis 50 of the scattering unit 16. A part of the laser light is diffusely scattered at the unit 16 by the dispersion disk 51 and is received by the photo element 52. The photo current is evaluated in the power measurement unit 110 (FIG. 12) and is digitally display at the display and operating field unit 19 such as illustrated in FIG. 4.

In order to check the telemetric precision, a part of the light pulse diffusely scattered at the dispersion disk 51 is coupled into both light waveguides 53 and 54 and is fed into the collimator 26 at the end of the common light waveguide 56 to be directionally beamed into the receiver 35. The transmission times of the same pulse caused by the lengths of the two light waveguide groups 53, 56 and 54, 56 are evaluated by the laser range finder 1 as a telemetric value and can be read at the first telemetric value display 20 of the operating and display field unit 19. In order to monitor the depth resolution, a part of the light is forwarded over the light waveguide line which is longer in comparison to the first light waveguide line i.e. over the line 54, 56 which forms the bypassed path. The appertaining telemetric values can be read from the second telemetric value display 21. It is noted, that the laser 39 is operated in a pulsed mode.

Finally the system sensitivity is determined via the so-called extinction value. To that end, the laser beam is likewise directed against a dispersion disk 51. A part of the scattered light is coupled into the collimator 26 via the light waveguide lines 53, 54 and 54 and 56 and is directionally beamed into the laser receiver 35. In order to determine the extinction value, the laser beam directed against the dispersion disk 51 is attenuated with the calibration attenuation filers 45 until only approximately 50% of the possible telemetric values of one of the two telemetric values are still displayed. The frequency or occurence of the possible telemetric value is determined from 100 measurements and is digitally displayed. Together with the internal or inherent attenuation of the test unit 4, the attenuation values of the attenuation filters produce a measure of the system sensitivity.

Although various minor modifications may be suggested by those versed in the art, it should be understood that we wish to embody within the scope of the patent granted hereon all such modifications as reasonably and properly come within the scope of our contribution to the art.

We claim:

1. An adjustment and test device for a laser ranging system particularly adapted for obtaining the parallel alignment of the optical axes of the transmitter and receiver of the system with respect to one another and with respect to an optical reference axis, said device comprising a test unit having a housing, a collimator and means for mounting the collimator in said housing for adjustment of the optical axis of the collimator in said housing, said collimator comprising a collimator lens, a beam splitter cube with a reticule, means for illuminating the reticule and means for observing the illuminating reticule; an optical adapter unit having an independent housing and having means for optically coupling the test unit to the laser ranging system, said optical adapter unit comprising at least one movable optical coupling element for interconnecting an optical axis of the laser ranging system to the collimator axis, each movable optical coupling element having a shape of a parallelelpiped with a pair of opposing surfaces being provided with parallel extending mirrors; and a mechanical adapter unit having means for mechanically coupling the test unit onto the laser ranging system to enable carrying out the adjustments and tests thereon.

2. An adjustment and test device according to claim 1, wherein the collimator is an infrared collimator, said light source for illuminating the reticule being an infrared light source having a filter disposed in the beam path between the source and reticule, said means for observing the illuminated reticule including an infrared image transducer, a mirror and an ocular for observing a reflected image of the transducer from said mirror.

3. An adjustment and test device according to claim 2, wherein the beam path of the infrared light from the light source and the beam path of the light going to the image transducer are parallel to one another and perpendicular to the beam path of the collimator, said beam path from the light source being directed into the beam path of the collimator by a partially reflective mirror and the beam path of the collimator being directed at the image transducer by means of a mirror.

4. An adjustment and a test device according to claim 1, wherein the collimator is designed as an infrared collimator, said means for illuminating being an infrared light source having a beam passing through a filter and being directed on the path of the collimator by a partially reflective mirror.

5. An adjustment and test device according to claim 1, wherein the means for mounting the collimator includes a support device movable in the x and y direction of a coordinate system by means for adjusting.

6. An adjustment and test device according to claim 5, wherein the means for adjusting comprise a pair of setting gear adjustable by two control knobs.

7. An adjustment and test device according to claim 1, wherin the mechanical adapter unit comprises at least two support plates, one of said support plates receiving screw type fasteners of the test unit for securing the test unit thereon, the remaining support plates extending at right angles to said one support plate and having said means for mechanically coupling the unit to said laser ranging system.

8. An adjustment and test device according to claim 1, wherein the optical adapter unit has means for mechanically coupling its housing to the housing of the test unit.

9. An adjustment and test device according to claim 8, wherein the means for mechanically coupling the test unit to the optical adapter unit includes overall dovetail guidance rails on the housing of said test unit, coacting dovetail surfaces on the housing of the optical adapter unit and screw means for clamping said surfaces together.

10. An adjustment and test device according to claim 1, wherein the test unit is optically coupled to the laser ranging system in such a manner that the collimator lens of the collimator is arranged opposite the receiver of the laser ranging system.

11. An adjustment and test device according to claim 1, wherein the two mirrors of the optical coupling element consists of a "Z" deflection mirror arrangement.

12. An adjustment and test device according to claim 1, which includes attenuation filters being disposed in the beam path between the laser transmitter and the collimator.

13. An adjustment and test device according to claim 12, wherein said attenuation filters are provided in the optical adapter unit.

14. An adjustment and test device according to claim 13, wherein the optical adapter unit has one optical coupling element for bridging the space between the collimator axis and the axis of the laser transmitter and said attenuation filters are disposed on the beam path of the transmission beam from the laser transmitter before it reaches the optical coupling element.

15. An adjustment and test device according to claim 12, wherein the attenuation filters are interchangeable.

16. An adjustment and test device according to claim 12, wherein an additional attenuation filter can be moved into and out of the beam path between the laser transmitter and the collimator for the purpose of decreasing the intensity of the laser beam.

17. An adjustment and test device according to claim 12, wherein the attenuation filters consist of calibrated glass filters.

18. An adjustment and test device according to claim 1, wherein the optical adapter unit includes a closed protective tube extending from the housing of the adapted unit and facing the laser transmitter, said protective tube bridging the space between the housing of the optical adapter unit and the laser transmitter optics.

19. An adjustment and test device according to claim 1, wherein said test unit includes a scatter unit in a closed space, said scatter unit having a reflective dispersion disk for diffusedly scattering laser light of the transmission beam being disposed in said closed space, a photo element being disposed in said space to receive scattered laser light and being connected to a power measuring unit.

20. An adjustment and test device according to claim 19, wherein the photo element comprises a photo detector.

21. An adjustment and test device according to claim 19, which includes a light waveguide line having one end coupled into the collimator and the other end arranged in said closed space to receive scattered light from said dispersion disk.

22. An adjustment and test device according to claim 21, wherein the one end of the light waveguide line is coupled to the collimator by being coupled to the beam splitting cube on the collimator axis.

23. An adjustment and test device according to claim 21, wherein the light waveguide line is wound into a coil.

24. An adjustment and test device according to claim 23, wherein said coil is disposed in the housing of the test unit.

25. An adjustment and test device according to claim 21, wherein the light waveguide line has a specific length in a range of approximately 300 to 900 m.

26. An adjustment and test device according to claim 19, wherein one of the optical coupling elements of the optical adapter unit bridges the space between the collimator axis and the laser transmitter axis and is movable to bridge the space between the scatter unit and the laser transmitter axis, said movable optical coupling being pivoted about the end disposed on the transmitter axis and said collimator and scatter unit being positioned in said test unit to lie in a circular arc and at the same distance from the transmitter axis.

27. An adjustment and test device according to claim 1, which has two optical coupling elements mounted for pivotable movement around the laser transmitter axis.

28. An adjustment and test device according to claim 21, in which a light waveguide line has a first portion extending from the closed space of the scatter unit and being connected by an optical coupler to a second portion extending to a collimator and said test unit including a third waveguide portion having a length different than the first portion extending from the closed space to the coupler so that the second portion is a common portion for the first and third portions.

29. An adjustment and test device according to claim 26, which has a second coupling element having a length equal to the spacing between the reference axis and the receiver axis and being pivotably mounted for movement between a position with the mirrors of the element positioned on the axes to a position withdrawn from the axes.

30. An adjustment and test device according to claim 29, wherein the second element pivots on the axis of the laser transmitter.

* * * * *